United States Patent
Thommana et al.

(10) Patent No.: US 9,948,383 B1
(45) Date of Patent: Apr. 17, 2018

(54) NETWORK SYNCHRONIZATION SYSTEM AND METHOD

(71) Applicant: Rockwell Collins, Inc., Cedar Rapids, IA (US)

(72) Inventors: John Thommana, Cedar Rapids, IA (US); Timothy E. Snodgrass, Palo, IA (US)

(73) Assignee: ROCKWELL COLLINS, INC., Cedar Rapids, IA (US)

(*) Notice: Subject to any disclaimer, the term of this patent is extended or adjusted under 35 U.S.C. 154(b) by 102 days.

(21) Appl. No.: 15/231,496

(22) Filed: Aug. 8, 2016

(51) Int. Cl.
*H04B 7/26* (2006.01)
*H04B 1/713* (2011.01)
*H04W 72/04* (2009.01)
*H04W 56/00* (2009.01)

(52) U.S. Cl.
CPC .......... *H04B 7/2671* (2013.01); *H04B 1/713* (2013.01); *H04W 56/003* (2013.01); *H04W 72/0446* (2013.01)

(58) Field of Classification Search
CPC ... H04B 7/2671; H04B 7/2678–7/2696; H04B 1/713; H04B 1/7136; H04B 1/7183; H04W 72/0446; H04W 56/001; H04W 56/0015; H04W 56/002; H04W 56/003
See application file for complete search history.

(56) References Cited

U.S. PATENT DOCUMENTS

| | | | | |
|---|---|---|---|---|
| 2010/0085989 A1* | 4/2010 | Belhadj | ................ | H04J 3/0667 370/503 |
| 2011/0019698 A1* | 1/2011 | Akae | .................... | H04J 3/0664 370/509 |
| 2014/0269669 A1* | 9/2014 | Newton | .................. | H04L 7/041 370/350 |

* cited by examiner

*Primary Examiner* — Pao Sinkantarakorn
*Assistant Examiner* — Kabir Jahangir
(74) *Attorney, Agent, or Firm* — Donna P. Suchy; Daniel M. Barbieri

(57) ABSTRACT

A communication network includes and a communication method uses a communication node configured to use a time division multiple access protocol to allow communication in the network. The time division multiple access protocol is configured to allocate time slots. The communication node includes a main transceiver and an auxiliary transceiver. The communication node is configured to listen for a synchronization signal using the main transceiver during a first window and to listen for a synchronization signal during a second window using the auxiliary transceiver.

12 Claims, 5 Drawing Sheets

NETWORK SYNCHRONIZATION SYSTEM AND METHOD

BACKGROUND

Tactical military and commercial applications require synchronization in dynamic environments and provide peer-to-peer communications. According to one communication application, software define radios (SDRs) often include an expensive 1 part per billion (ppb) or less reference oscillator. The expensive local oscillator is necessary to maintain local clock synchronization in GPS denied environments and allow greater separation time from the network without requiring initialization.

Networking waveforms or communications use synchronization slots to maintain network and time synchronization. If a conventional synchronized network splits into two subnetworks in a global positioning system (GPS) denied environment for duration of time, the two subnetworks can remerge only if they receive the synchronization bursts during a synchronization time slot when they come back into communication range. For this to occur, the time drift between the two subnetworks has to be less than the duration of half the time of the synchronization slot. Thus, for remerging subnetworks without a time consuming initialization procedure, the amount of time the two networks can be separated in a GPS denied environment is dependent on the accuracy of the local oscillator and the length of the synchronization time slot and number of the synchronization slots. Synchronization slots are network overhead and increasing the number of synchronization slots or the length of synchronization slots adversely affects the network throughput.

SUMMARY

In one aspect, embodiments of the inventive concepts disclosed herein are directed to a communication network. The communication network includes a communication node configured to use a time division multiple access protocol to allow communication in the network. The time division multiple access protocol is configured to allocate time slots. The communication node includes a main transceiver and an auxiliary transceiver. The communication node is configured to listen for a synchronization signal using the main transceiver during a first window and to listen for a synchronization signal during a second window using the auxiliary transceiver.

In a further aspect, embodiments of the inventive concepts disclosed herein are directed to network synchronization method. The method includes receiving a synchronization signal using an auxiliary receiver. The synchronization signal is provided outside of a synchronization time slot. The method also includes determining offset information in response to the synchronization signal received outside of a synchronization time slot, and adjusting a clock signal used in a main receiver in response to the offset information.

In a further aspect, embodiments of the inventive concepts disclosed herein are directed to a method of synchronizing a stacked network system. The method includes joining a first stacked network using a main transceiver in a communication node, and searching for a second stacked network using an auxiliary transceiver in the communication node.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Figure 1:
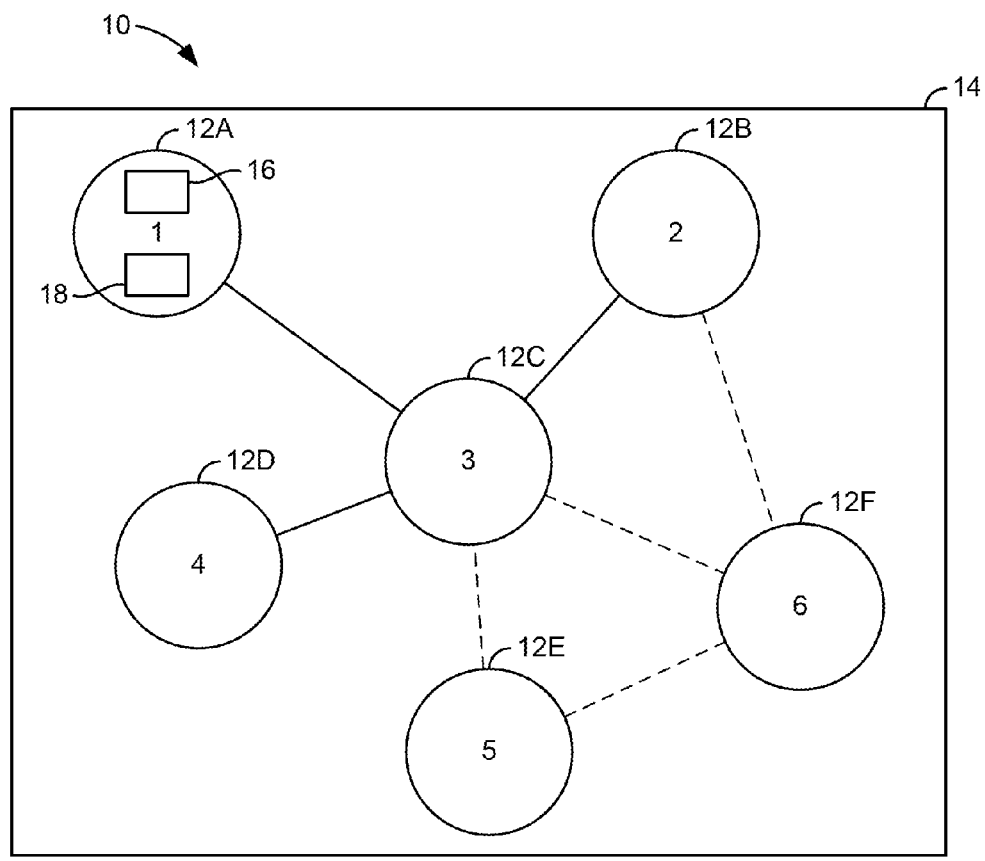
FIG. 1 is a block diagram of communication nodes within a network in accordance with an exemplary embodiment of the inventive concepts disclosed herein.
Figure 2:
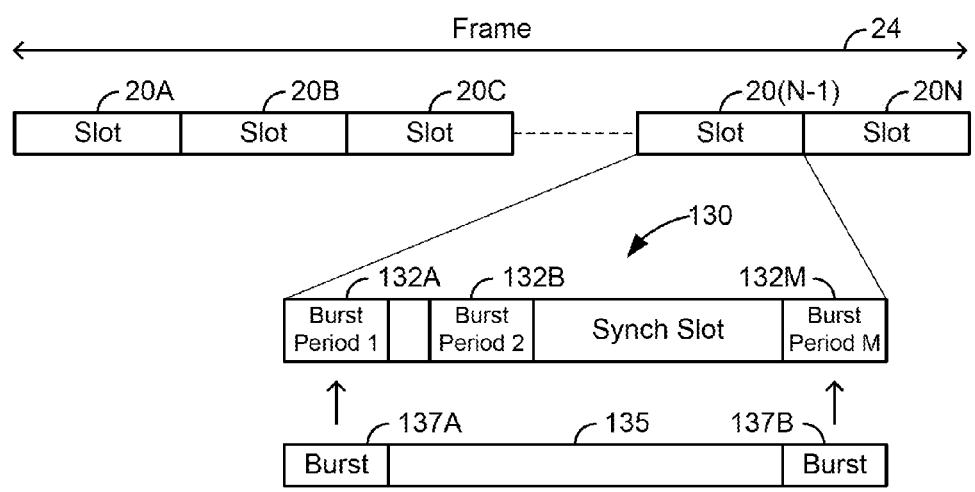
FIG. 2 is schematic illustration of a frame including time slots for the communication nodes illustrated in FIG. 1 according to another embodiment of the inventive concepts disclosed herein.

With reference to FIGS. 1-2, a communication system 10 includes a number of communication nodes 12A-F within a network 14. The communication nodes 12A-F are SDRs in some embodiments. In some embodiments, the communication nodes 12A-F include a main transceiver (transmitter/receiver) 16 and an auxiliary transceiver 18. The transceivers 16 and 18 can be receivers in some embodiments. In some embodiments, the communication nodes 12A-F are Rockwell Collins AR-1000 and AR-1500 SDRs. In some embodiments, the communication nodes 12A-F are configured so that the auxiliary transceiver 18 is used to increase the ability to listen for and find synchronization bursts without sacrificing data throughput.

The communication system 10 can communicate one or more messages between or among the communication nodes 12A-F. With reference to FIG. 2, each of the communication nodes 12A-F is assigned particular time slots 20A-N in a continuum of recurrent frames, such as a frame 24, for transmission of its bursts and for reception of its own bursts and the bursts of other nodes in some embodiments. The number of time slots 20A-N is from 1 to N, where N is any integer. Assignment of the time slots 20A-N is accomplished using a variety of protocols in some embodiments.

A time division multiplex (TDMA) protocol is used by the communication system 10 in some embodiments. The TDMA protocol is subdivided into multiple cycles in some embodiments. For example, a bootstrap cycle and a broadcast cycle each of one second duration is included as part of the TDMA protocol in some embodiments. Each cycle has the same or different duration and support different communication functions in some embodiments. For example, the bootstrap cycle includes information transmitted to each communication node 12A-E that allocates the time slots 120A-N among the communication nodes 12A-E. The broadcast cycle includes the allocated time slots 120A-N for broadcast transmission between the communication nodes. The number of cycles, the length of the cycle, the length of each frame, the number of time slots, the subdivisions of the time slots, etc. is a matter of design choice, and should not be viewed as limiting; other numbers of cycles, frame lengths, time slot subdivisions, etc. are used in some embodiments.

In some embodiments, at least one of the time slots 20A-N is a synchronization time slot 130. The synchronization time slot 130 includes burst slots or burst periods 132A-M. The number of burst periods 132A-M is from 1 to M, wherein M is an integer. In some embodiments, M is 2 and the burst periods 132A-M are at or near a beginning and an end of the synchronization time slot 130.

Figure 3:
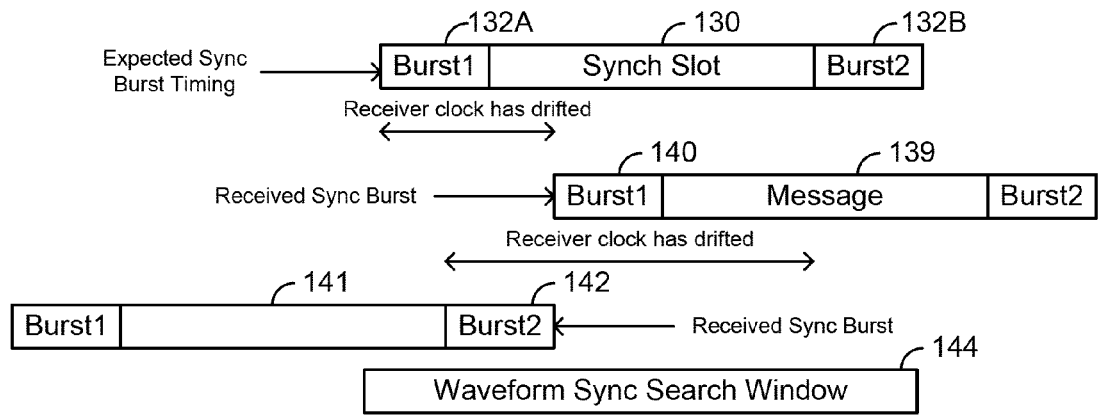
FIG. 3 is a schematic diagram of synchronization timing for the communication node illustrated in FIG. 2 according to another embodiment of the inventive concepts disclosed herein.

With reference to FIGS. 2-3, the operation of the network 14 is described below with reference to the communication node 12A. Other communication nodes 12B-N operate in a similar fashion. If the communication node 12A (FIG. 1) receives a communication 135 (FIG. 2) including first and/or last synchronization bursts 137A-B (FIG. 2) at the appropriate time (e.g., in respective periods 132A and 132M), the communication node 12A is in coarse network synchronization. If the communication node 12A receives the communication 139 (FIG. 2) with a first synchronization burst 140 delayed from the appropriate time (e.g., the burst period 132A) and is within the synchronization time slot 130, the internal time for the communication node 12A has drifted forward by the delay. If the communication node 12A misses the first synchronization burst 142 of the communication 141 but receives the second synchronization burst 142 in the synchronization time slot 130, the internal time of the communication node 12A has drifted backwards. Using the synchronization bursts 140 and 142 received in a waveform synchronization search window 144 associated with the synchronization time slot 130, every one of the communication nodes 12A-F in the network 14 maintains coarse synchronization using the main transceiver 16 in some embodiments. Fine network synchronization is achieved by sending a deterministic round trip timing message to the best available time source and correcting the timing error in some embodiments. The round trip timing message includes a transmit time stamp and receive time stamp.

Figure 4:
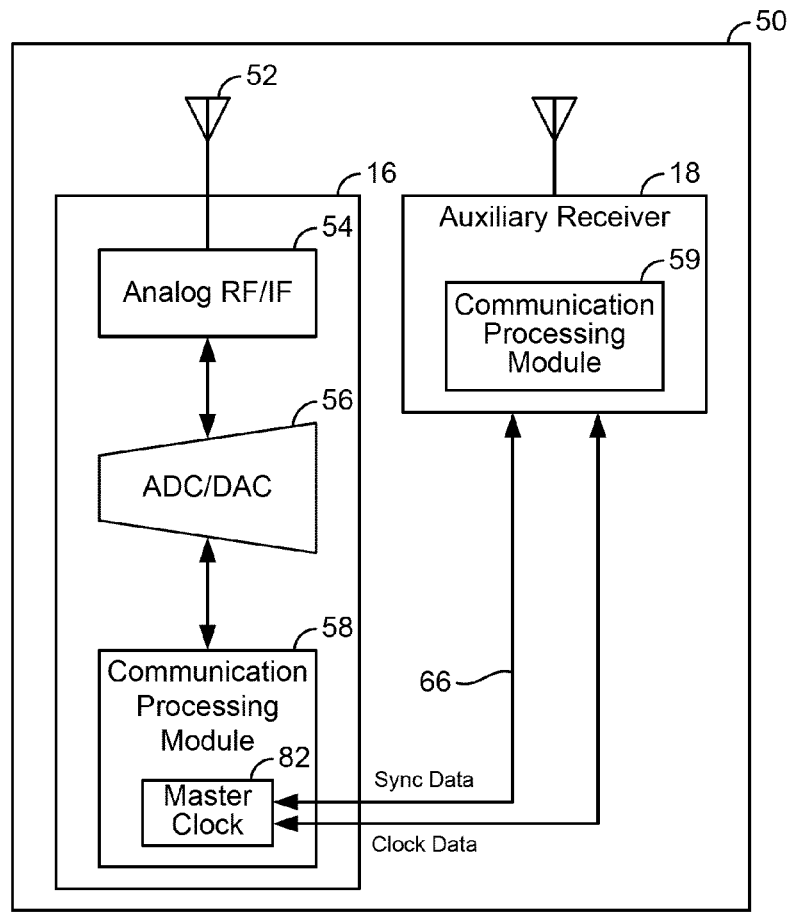
FIG. 4 is a block diagram of one of the communication nodes of the network illustrated in FIG. 1 according to another embodiment of the inventive concepts disclosed herein.

With reference to FIG. 4, a communication node 50 in accordance with an exemplary embodiment is shown. The communication node 50 can be any of communication nodes 12A-F in FIG. 1. The communication node 50 includes the main receiver or transceiver 16 and the auxiliary receiver or transceiver 18. The main transceiver 16 includes a transceiver antenna 52, an analog RF/IF filter 54, an analog-to-digital converter/digital-to-analog converter (ADC/DAC) 56, and a communication processing module 58. The communication node 50 has communication capabilities across the entire communication spectrum or across only a portion of the spectrum. In operation, a communication signal is received by transceiver antenna 52, filtered from a transmission radio frequency (RF) to an intermediate frequency (IF) by the analog RF/IF filter 54, converted from an analog signal to a digital signal by ADC/DAC 56, and demodulated and otherwise processed by the communication processing module 58 to extract information. Similarly, in a reverse procedure, digital data formed and modulated by the communication processing module 58 is sent to the ADC/DAC 56, converted from a digital signal to an analog signal by the ADC/DAC 56, filtered from IF to RF by the analog RF/IF filter 54, and transmitted by the transceiver antenna 52. In another alternative embodiment, the communication node 50 may include separate transmit and receive antennas. Additional components may be utilized by the communication node 50. For example, the communication node 50 includes one or more power source that may be a battery.

The auxiliary transceiver 18 includes similar components to the main transceiver 16. The auxiliary transceiver 18 shares the antenna 52 with the main transceiver 16 in some embodiments. The auxiliary transceiver 18 includes a communication processing module 59 configured to provide synchronization or offset data to the communication processing module 58. The communication processing modules 58 and 59 are circuits configured by programming and are embodied as signal processors executing software, programmable logic devices, application specific circuits, and combinations thereof.

The communication processing module 58 includes a master clock 82. Master clock 82 includes a 0.5 ppm reference oscillator or a 0.1 ppm oscillator in some embodiments. In some embodiments, higher accuracy reference oscillators are utilized (e.g., 0.02-0.03 ppm reference oscillators). The auxiliary transceiver 18 can be configured to receive the master clock signal and provide synchronization data at an input 66 if the synchronization burst is detected outside of the waveform synchronization search window 144 (FIG. 3), thereby allowing lower cost oscillators to be utilized in some embodiments.

As discussed previously with reference to FIG. 2, the communication node 50 is assigned selected time slots for transmission based on the node's needs in some embodiments. The communication node 50 is able to receive in the time slots 120A-N that it has not been assigned to transmit. The communication node 50 may have more than one time slot either consecutive or spaced within one or more frames 24. The communication node 50 is designated to serve as a time reference for synchronization of the time base of the other communication nodes 12A-G operating within the network 14 to the same time in some embodiments. Any communication node 50 can serve as the time reference. Alternatively, the network 14 is self-organizing.

Using the TDMA protocol, each carrier frequency is divided into a plurality of frames 24 of a specific time duration in some embodiments. Each TDMA frame 24 for example, includes a preamble, information, and a guard window. Further, each frame 24 includes a plurality of frequencies. The information is subdivided into a plurality of time slots 20A-N. Each time slot 20A-N, for example, includes trail bits, a synchronization word, a communication message, and guard bits in some embodiments.

Figure 5:
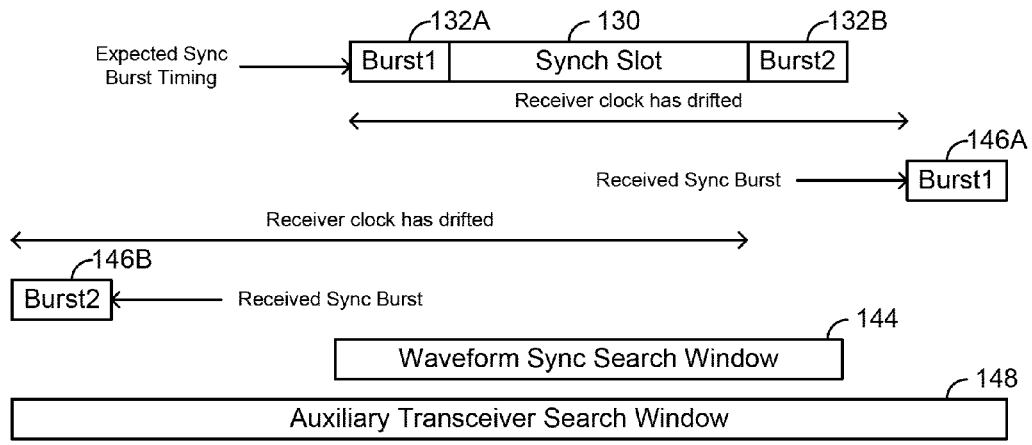
FIG. 5 is a schematic diagram of synchronization timing for the communication node illustrated in FIG. 2 according to another embodiment of the inventive concepts disclosed herein.

With reference to FIGS. 1 and 5, at least one of the communication nodes 12A-F are mobile. For example, the communication nodes 12E-F are mobile and move apart from the communication nodes 12A-D to a point where the communication nodes 12A-D no longer communicate with the communication nodes 12E-F (e.g., the two groups of communication nodes 12A-D and E-F cannot hear each other). In another example, the communication nodes 12E-F and the communication nodes 12A-D can start a mission from different bases and can meet at a location. Once the communication nodes 12E-F and the communication nodes 12A-D are rejoined or meet at a common location, the communication nodes 12E-F and the communication nodes 12A-D form the single network 14 for communication. If the communication nodes 12E-F and the communication nodes 12A-D do not have precise time information via GPS or other sources, the internal time tracked by the group of the communication nodes 12E-F and the group of the communication nodes 12A-D drift from each other.

The group of the communication nodes 12E-F maintains its own local time synchronization using their local synchronization bursts. Similarly, the group of the communication nodes 12A-D maintains its own local time synchronization using their local synchronization bursts. However, the local time for the communication nodes 12E-F drifts apart from the local time for the communication nodes 12A-D. If the communication nodes 12E-F and the communication nodes 12A-D remain apart for a long enough time, the time difference between their local clock information can become greater than the duration of the synchronization time slot 130. When the communication nodes 12E-F and the communication nodes 12A-D come into communication range after separation, the group of the communication nodes 12E-F and the group of the communication nodes 12A-D communicate their respective bursts 146A-B (FIG. 5). If the communication bursts 146A-B are outside the duration of the synchronization time slot 130 (e.g., the waveform synchronization search window 144), the communication between the group of the nodes 12A-D and the group of the communication nodes 12E-F is prevented and resynchronization and reformation/formation of the single network 14 is not achieved by the main transceiver 16. To reinitialize, the other network must be detected which may not be possible if the networks continuously keep interfere with each other's communication.

The auxiliary transceiver 18 is used to increase the waveform synchronization search window 144 beyond the duration of the synchronization time slot 130 without increasing the duration of the synchronization time slot 130 in some embodiments. In some embodiments, the auxiliary transceiver 18 provides an auxiliary transceiver synchronization search window 148 that extends the time for receiving or listening for the burst communications 146A from the communication nodes 12A-F and the burst communications 146B from the communication nodes 12A-F. In some embodiments, the burst communication 146A is a first burst communication and the burst communication 146B is a second burst communication.

In some embodiments, the main transceiver 16 of the communication nodes 12A-F supports a plus or minus one millisecond drift handling synchronization time slot 130 and the auxiliary transceiver 18 is configured to receive the burst communications 146A-B one millisecond before the start of the synchronization time slot 130 and continues looking for the synchronization bursts 146A-B one millisecond after the synchronization time slot 130 ends. In some embodiments, the main transceiver 16 misses the synchronization bursts 146A-B because they are out of the waveform synchronization search window 144 but the auxiliary transceiver 18 is able to receive the synchronization bursts 146A-B in the auxiliary transceiver synchronization search window 148, thereby permitting both groups of the communication nodes 12E-F and the communication nodes 12A-D to be able to see each other, determine the time offset and start the network merging process within the network 14.

The synchronization data or offset data is provided from the auxiliary transceiver 18 to the main transceiver 16 via the input 62 (FIG. 4) and the master clock 82 adjusts the clock in accordance with the synchronization data in some embodiments. For example, the clock circuit or master clock 82 (FIG. 4) increases or decreases its internal time according to the synchronization data. The auxiliary transceiver 18 compares the time the burst communications 146A-B are received to the expected time to calculate the offset information in some embodiments. The burst communications 146A-B include identification information so that the expected time for the burst communication can be determined in some embodiments.

If the auxiliary transceiver 18 receives either of the burst communications 146A-B within the auxiliary transceiver synchronization search window 148 which is greater than the waveform synchronization search window 144, the communication nodes 12E-F and the communication nodes 12A-D merge even though neither of the burst communications 146A-B is in the waveform synchronization search window 144 in some embodiments. The waveform or communication still operates using the shorter synchronization time slot 130 thereby not reducing data throughput. In some embodiments, the size of the auxiliary transceiver synchronization search window 148 is set using a waveform configuration parameter thereby enabling mission planners to set the search window on a mission by mission basis.

In some embodiments, during cold/warm start, the initial search for communication nodes 12A-F in the network 14 using the main transceiver 16 takes a finite amount of time that is proportional to the time uncertainty. For example, a waveform or communication requires a long time period to search the time uncertainty using the main transceiver 16. This search window can be substantially reduced if the auxiliary transceiver 18 is also used along with the main transceiver 16 to search the finite amount of time that is proportional to the time uncertainty.

Figure 6:
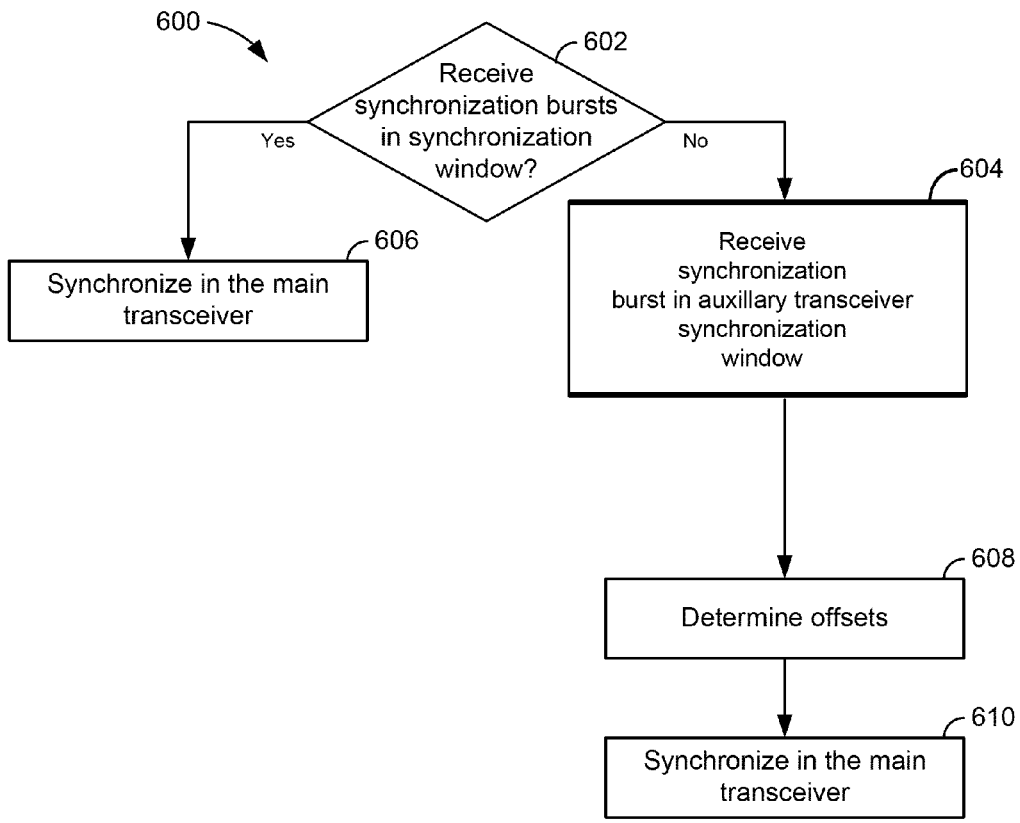
FIG. 6 is a flow diagram illustrating exemplary operations for the communication nodes of the network illustrated in FIG. 1 according to another embodiment of the inventive concepts disclosed herein.

With reference to FIG. 6, at least one of the communication nodes 12A-F can operate according to a flow 600 to synchronize with other communication nodes 12A-F in the network 14. At an operation 602, the communication nodes 12A-F listen for a burst communication in the waveform synchronization search window 144 using the main transceiver 16. If the synchronization burst is received in the waveform synchronization search window 144, the communication nodes 12A-G synchronize to the network 14 using the main transceiver 16 in an operation 606. The operation 606 can include fine network using a deterministic round trip timing message to the best available time source and correcting the timing error in some embodiments.

If the synchronization burst is not received in the waveform synchronization search window 144 in the operation 602, the communication node 12A listens for a burst communication in the auxiliary transceiver synchronization search window 148 using the auxiliary transceiver 18 in an operation 604. If the synchronization burst is received in the auxiliary transceiver synchronization search window 148, the communication nodes 12A-F determine offset information in an operation 608. At an operation 610, the communication nodes 12A-F synchronize to the network 14 using the main transceiver 16 with its clock adjusted by the offset information.

Figure 7:
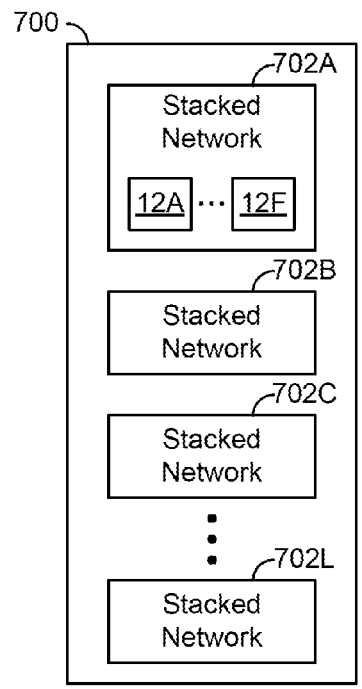
FIG. 7 is a block diagram of a communication system including stacked networks in accordance with an exemplary embodiment of the inventive concepts disclosed herein.
Figure 8:
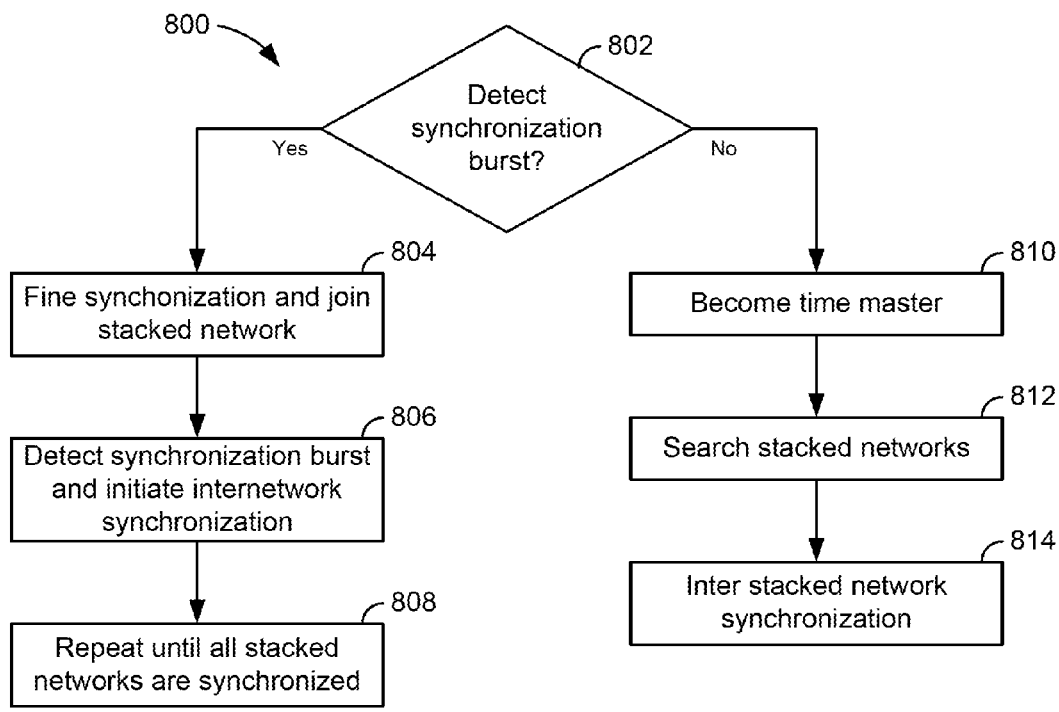
FIG. 8 is a flow diagram illustrating exemplary operations for the stacked networks illustrated in FIG. 1 according to another embodiment of the inventive concepts disclosed herein.

With reference to FIGS. 7 and 8, networking waveforms or communications use an orthogonal stacked network system 700 in some embodiments. In some embodiments, the network 14 (FIG. 1) is part of the orthogonal stacked network system 700 as one of the stacked networks 702A-L. The number of the stacked networks 702A-L is from 1 to L, where L is an integer. Each of the stacked networks 702A-L includes communication nodes 12A-F (FIG. 1) in some embodiments.

In some embodiments, the stacked networks 702A-L are orthogonal stacked networks that are stacked one on top of the other in time so that frequency use can be maximized in some embodiments. The stacked networks 702A-L use the same frequency table in an orthogonal fashion so as to not interfere with each other. Drift in timing between the stacked networks 702A-L breaks the orthogonality and creates self-interference due to multiple stacked networks 702A-L using the same frequency at the same time. In some embodiments, the auxiliary transceivers 18 (FIG. 1) in the communication nodes 12A-F of the stacked networks 702A-L are used to track the stacked networks 702A-L and align them in time without a throughput penalty. The auxiliary transceiver 18 is employed for the entire duration of the frame 24, thereby increasing the search window by orders of magnitude.

In GPS denied environments, each of the stacked networks 702A-L in the stacked network system 700 drifts independently and can interfere with each other. Since all the stacked networks 702A-L use frequency in an orthogonal fashion, a substantial amount of network search time has to be allotted in each of the stacked networks 702A-L to search for other stacked networks 702A-L in the vicinity and correct time drifts so as to reduce self-interference. Network throughput on the order of 20% to 40% has to be sacrificed to make orthogonal stacked networks work in GPS denied environments without using the auxiliary transceiver 18.

In some embodiments, a cold start time synchronization procedure 800 for the stacked network system 700 uses the main transceiver 16 and the auxiliary transceiver 18 of the communication nodes 12A-G (FIG. 1). The main transceiver 16 continuously looks for synchronization bursts sent by a peer node for a prescribed amount of time at an operation 802. If a synchronization burst is detected, a fine synchronization procedure is implemented so the communication node associated with the main transceiver 16 can join the stacked network 702A of the stacked network system 700 in an operation 804. If a synchronization burst is not detected by the main transceiver 16, a synchronization procedure using the auxiliary transceiver synchronization search window 148 is implemented to join the subnetwork 802A in some embodiments. Once the communication node associated with the main transceiver 16 joins the stacked network 702A in the operation 804, the auxiliary transceiver 18 looks for the stacked networks 702B-L in the stacked network system 700 in an operation 806. If a synchronization burst of one of the stacked networks 702B-L is found, internetwork synchronization is initiated in the operation 806 if the found stacked network has a better time quality than the time quality of the stacked network 702A. If the found stacked network has poorer time quality, the found stacked network initiates an internetwork synchronization procedure when it finds the stacked network 702A. The operations 804 and 806 are repeated until all the stacked networks 702A-L are synchronized.

In the operation 802, if the synchronization burst from a peer node is not detected, the communication node 12A becomes a time master and starts sending out synchronization bursts in an operation 810 in some embodiments. After becoming the time master, the communication node 12A starts searching for other stacked networks 702B-L using the auxiliary transceiver 18 in an operation 812 in some embodiments. If a synchronization burst of one of the stacked networks 702B-L is found, the inter-network synchronization procedure is initiated with the found stacked network if its time quality is better than the time quality of the communication node 12A in an operation 814. If the found stacked network has poorer time quality, the found stacked network initiates an inter-network synchronization when it finds the stacked network 702A. The procedure 800 is continued until all stacked networks 702B-L are synchronized.

Searching the stacked network system 700 is a time consuming process as this is similar to the cold/warm start where time uncertainty magnitude determines the search duration. If all the stacked networks 702A-L have the same 15 second time uncertainty then searching for every stacked network 702A-L without using the auxiliary transceiver 18 can take up to 2 minutes each. Worst case missions deploy about 32 stacked networks 702A-L so it takes 64 minutes to find all stacked networks 702A-L in some embodiments.

In certain applications, geographic separation and terrain topography prevent multiple stacked networks 702A-L from seeing each other. For example, the stacked network 702A may never come within communication range of the stacked network 702B and do not find each other during the mission. This information is known to mission planners and leaders. Thus the mission planning profile includes an ordered list of stacked networks 702A-L so the stacked network likely to be missing is the last entry in the stacked network search profile and vice versa. This ensures that the stacked networks 702A-L search out the stacked networks 702A-L in the vicinity first before wasting time looking for the stacked networks 702-L that may never come in communication range in some embodiments.

Missions are also very fluid (e.g. circumstances force changes that were not preplanned). For example, the stacked network 702A may be sent to assist the stacked network 702B in an emergency. In this situation the radio operator can initiate a search for any of the stacked networks 702A-L at any time. Dynamic reordering of search profiles over the air or locally is supported in some embodiments.

The stacked network search will not typically take 64 minutes because each of the stacked networks 702A-L is searching out other stacked networks 702A-L and aligning themselves in time. For example if the stacked networks 702B-E are aligned in time, the stacked network 702A might take 2 minutes aligning itself to the stacked network 702B but should be able to find the stacked networks 802 C-E immediately.

Once coarse synchronization is achieved, fine synchronization is obtained by sending a round trip timing message. If a communication node 12A of the stacked network 702A is found and the communication node 12C of the stacked network 702D determines that the stacked network 702D has a better time source and that its time is ahead by 2 milliseconds, the communication node 12A of the stacked network 702A cannot update its time with the new time because that will make the communication node 12A fall out of synchronization with its peer nodes in the stacked network 702A. The communication node 12A broadcasts a time correction message to all its peers and agrees to a common time change time (e.g, using a start of frame 70014) for the stacked network 702A to move forward in time as a group and synchronize with the stacked network system 700. Some communication nodes 12A-F may have to reacquire synchronization with its peers if it misses the message. Once the stacked networks 702A-L are aligned in time, a less intensive synchronization maintenance phase can be entered.

In some embodiments, a network search for the entire duration of the frame (250 millisecond) is performed. Each of the stacked networks 702A-L transmits at least one synchronization burst in every frame in some embodiments. This ensures that during that frame, the stacked network of the stacked networks 702A-L is found even if its time has drifted by approximately plus or minus 125 milliseconds. In some embodiments, around 32 stacked networks A-L have to be supported. If the auxiliary transceiver 18 searches out one network every frame, it will takes 32 frames or 8 seconds to maintain time synchronization across all the stacked networks 702A-L in some embodiments. The synchronization burst has a better than 95% error completion rate and there are a minimum of two bursts in a synchronization slot in some embodiments. Thus, the probability of missing both bursts is very low, thereby providing confidence of being able to receive the burst if in communication range. A 0.5 ppm clock will drift plus or minus 4 µs in 8 seconds. When all stacked networks 702A-L hear each other, the maximum time drift possible between any two stacked networks is plus or minus 4 µs.

Once network synchronization has been achieved, the whole frame for that network is not searched because the network can only drift at 0.5 ppm. Therefore a smaller search window can be employed for the stacked networks 702A-L that are in close synchronization. The search window can be incrementally increased as the duration between the synchronization bursts detected from that network increases in some embodiments. Once the time increases beyond an hour, the window can be increased to the frame duration because the time that the network comes back into communication range is unknown so the whole frame duration dedicated to that frame is searched in some embodiments.

When searching for stacked networks 702A-L, a network can only determine the time differential between its time and that of the stacked network that was found. Even though each node in each stacked network exchanges the time quality of its time source with its peer, this information can only be received if they are part of the network. Synchronization bursts generally use preambles and the only information that can be decoded from those preambles is the identity of the specific synchronization burst that was sought. In some embodiments, the time quality metric can be exchanged in the synchronization slot so that stacked networks 702A-L can make a decision whether they want to use this time source as a time master without having to send the round trip timing message and acquiring fine time synchronization.

In some embodiments, a pseudorandom set of mid-ambles are added to the synchronization burst for exchanging fixed coded information between the stacked networks 702A-L. For example, the stacked networks 702A-L that have precise time (GPS, atomic clocks etc.) add a specific pseudorandom mid-amble that indicates that it has precise time. In some embodiments, the stacked networks 702A-L with less precise time information search for the precise time mid-amble and find the stacked networks 702A-L that have precise time and synchronization with that network first and reduce the stacked network alignment time by an order of magnitude. Time alignment with the stacked networks 702A-L not having precise time is performed only if there are no stacked networks visible that have precise time in some embodiments.

Figure 9:
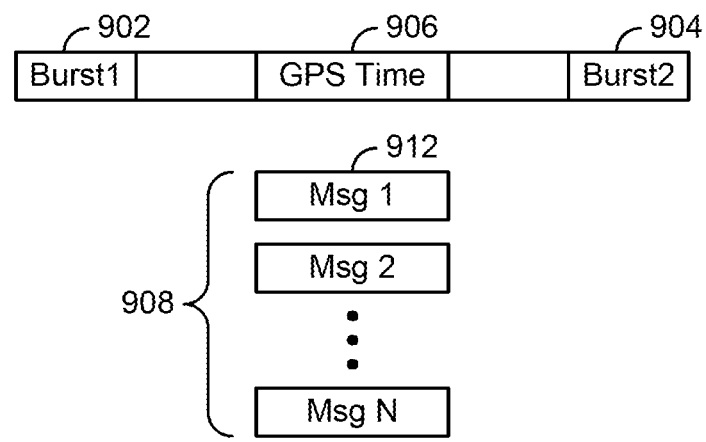
FIG. 9 is a schematic diagram of a synchronization time slot for the communication system illustrated in FIG. 7 according to another embodiment of the inventive concepts disclosed herein.

With reference to FIG. 9, the stacked network system 700 uses a time slot 900 in some embodiments. In some embodiments, a burst 1 communication region 902 and a burst 2 communication region 904 are provided at or near the ends of the time slot 900 and are used for coarse time synchronization. Multiple pseudorandom mid-ambles 908 are used to exchange fixed codes between the stacked networks 702A-F. The number of mid-amble codes that are supported depends on the processing resources available as correlators consume substantial FPGA/DSP resources in some embodiments. A GPS time mid-amble 910 is used internally and the meaning of the mid-ambles 908 is configured on a per mission basis in some embodiments. For example, a mid-amble 908 is a message indicating that a preset X should be tuned to receive an emergency message.

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter. The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments (which can be practiced separately or in combination) were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A network synchronization method, comprising:
receiving a synchronization signal using an auxiliary receiver of a communication node, the synchronization signal being provided outside of a synchronization time slot;
determining offset information in response to the synchronization signal received outside of the synchronization time slot; and
adjusting a clock signal used in a main receiver of the communication node in response to the offset information.

2. The method of claim 1, further comprising:
synchronizing to another communication node in a network using the clock signal after the adjusting step.

3. The method of claim 1, further comprising:
receiving a synchronization signal provided in the synchronization time slot using the main receiver; and
performing fine synchronization using the main receiver in response to the synchronization signal provided in the synchronization time slot.

4. The method of claim 3, further comprising:
synchronizing to another communication node in a network using the main receiver.

5. The method of claim 1, further comprising:
performing an initialization procedure using the main receiver if the synchronization signal is outside of an auxiliary receiver synchronization window, the auxiliary receiver synchronization window being longer than the synchronization time slot.

6. The method of claim 1, further comprising:
performing an initialization procedure using the main receiver and the auxiliary receiver if the synchronization signal is outside of an auxiliary receiver synchronization window, the auxiliary receiver synchronization window being longer than the synchronization time slot.

7. The method of claim 6, further comprising:
selecting a length of the auxiliary receiver synchronization window.

8. The method of claim 1, wherein the main receiver and the auxiliary are transceivers.

9. A method of synchronizing a stacked network system, the method comprising:
joining a first stacked network using a main transceiver in a communication node;
searching for a second stacked network using an auxiliary transceiver in the communication node;
receiving a synchronization signal using the auxiliary transceiver, the synchronization signal being provided outside of a synchronization time slot;
determining offset information in response to the synchronization signal received outside of the synchronization time slot; and
adjusting a clock signal used in the main transceiver in response to the offset information.

10. The method of claim 9, further comprising:
initiating a synchronization burst with the second stacked network if the second stacked network has a better time quality than the communication node.

11. The method of claim 9, further comprising:
providing an ordered list for searching for a plurality of stacked networks.

12. The method of claim 9, further comprising:
using a synchronization time slot for receiving a synchronization signal comprising a mid-amble including timing information.

* * * * *